Patented Sept. 23, 1947

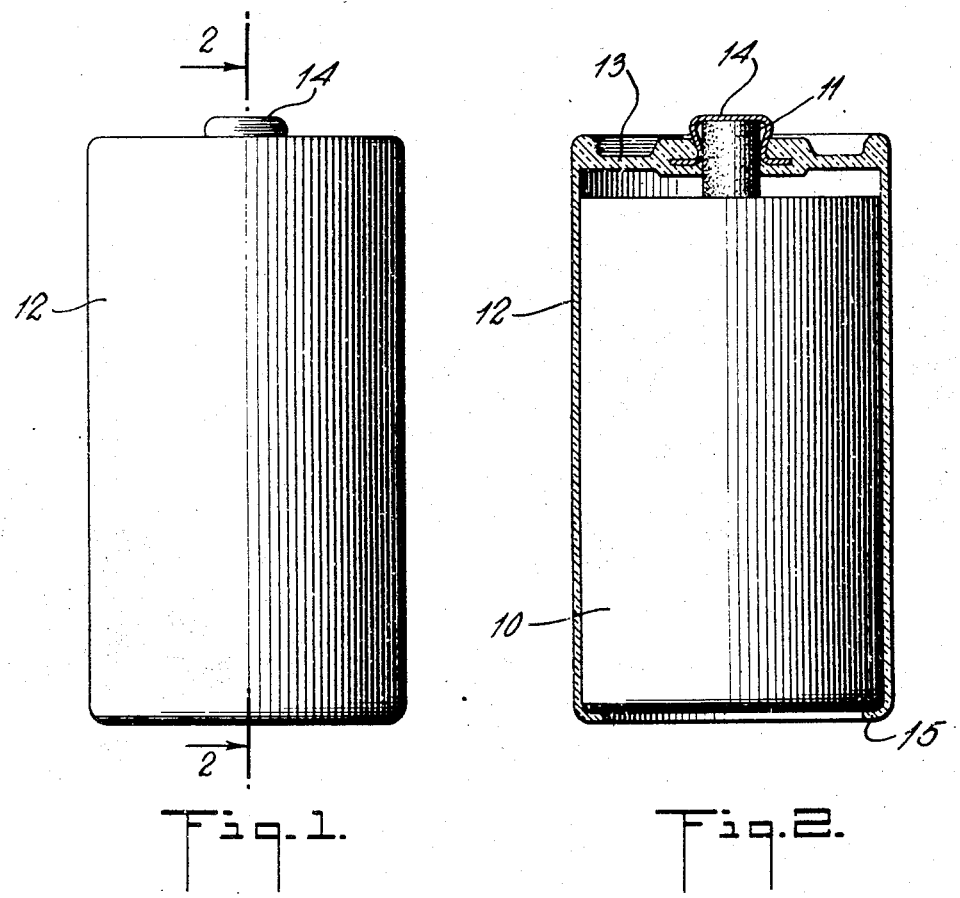

2,427,914

UNITED STATES PATENT OFFICE 2,427,914

FLASHLIGHT BATTERY WITH PLASTIC CASING

Israel Koretzky, Clifton, and Frederick A. Keller, East Paterson, N. J., assignors to Bright Star Battery Company, Clifton, N. J., a corporation of New Jersey Application August 21, 1943, Serial No. 499,476

1 Claim. (Cl. 136—133)

This invention relates to batteries and more especially to flashlight batteries.

An object of this invention is an improved flashlight battery construction.

A battery constructed according to the present invention comprises a cup of zinc or other suitable metal containing a cartridge having a centrally arranged electrode of carbon or other suitable material. A shell of ethyl cellulose or other suitable plastic material closed at one end fits over the open end of the cup and has the edge of its open end turned over the bottom of the cup. A metal cap is sealed in the closed end of the shell with a portion of the cap extending beyond the end and with the cap receiving the end of the central electrode. The cap is embedded in the closed end of the shell in such manner that no portion of it is exposed to contact with electrolyte which may escape from the cartridge.

The plastic shell forms a gas-tight seal with the metal cup and also obviates the need of the paper tube now used to insulate the curved surface of the cup. By reason of the cap being embedded in the plastic material, no washers are required over the top of the cartridge as heretofore to prevent contact of escaped electrolyte with the cap. For this reason, the usual spacing between the top of the cartridge and the sealing member may be decreased thereby making it possible to increase the length of the cartridge and thus provide additional electrolyte without changing the overall length of the battery. Also, for the same overall length of battery a shorter cup may be used, thus conserving zinc.

Other objects, novel features and advantages of this invention will become apparent from the following specification and accompanying drawings, wherein:

Fig. 1 is a side elevation of a flashlight battery embodying the invention, and

Fig. 2 is a section on the line 2—2 of Fig. 1.

In Fig. 2, 10 indicates the usual zinc cup of a flashlight battery in which is contained the usual cartridge (not shown). A centrally arranged carbon electrode 11 is embedded in the cartridge in the usual manner and projects above the rim of the cup 10. A shell 12 of plastic material surrounds the cup 10 and is provided at one end with an integral closure 13 in which is embedded a cap 14 of brass or other similar material. The cap 14 is so arranged as to receive the upper end of the carbon electrode 11 and has a portion extending beyond the outer surface of the closure 13. As has heretofore been customary, the cap 14 is so arranged as to have a portion of reduced diameter snugly fitting the carbon electrode to make contact therewith. The flange of the cap is embedded in the plastic material in such manner that with the electrode inserted, no portion of the cap is exposed to attack by electrolyte escaping from the cartridge. The rim of the upper end of the shell 12 is turned in as shown at 15 to hold the shell on the cup and form a gas-tight seal between the cup and the shell.

In constructing the battery above described, the cartridge and carbon electrode are assembled in the cup 10. The shell 12 with the cap sealed therein is produced by an injection molding operation and the shell is of uniform interior diameter throughout its entire length. The assembled cup, cartridge and carbon electrode are inserted into the shell and the carbon electrode is forced into the cap 14. Next, the rim of the open end of the shell is turned over the bottom end of the cup at 15 to complete the assembly of the battery. The cartridge is located in the shell by engagement of the end of the carbon electrode 11 with the inner surface of the cap 14.

We claim:

A battery comprising a metal cup containing a cartridge having a centrally arranged electrode, a plastic material shell closed at one end, said shell fitting over said cup with the cup rim facing said closed end, an integral flange at the remaining end of said shell extending inwardly over the bottom of said cup, and a metal cap mounted in the closed end of said shell with a portion of said cap extending therebeyond and with the end of said electrode received in said cap.

ISRAEL KORETZKY.
FREDERICK A. KELLER.

REFERENCES CITED

The following references are of record in the file of this patent:

UNITED STATES PATENTS

| Number | Name | Date |
|---|---|---|
| 406,223 | Lee | July 2, 1889 |
| 1,299,813 | Armelin | Apr. 8, 1919 |
| 1,490,455 | Combs | Apr. 15, 1924 |
| 2,149,169 | Gelardin | Feb. 28, 1939 |
| 2,262,836 | Deibel | Nov. 1, 1941 |
| 2,315,592 | Cargill | Apr. 6, 1943 |
| 2,346,640 | Anthony | Apr. 18, 1944 |

FOREIGN PATENTS

| Number | Country | Date |
|---|---|---|
| 9,948 | Australia | 1932 |
| 438,663 | Great Britain | Nov. 18, 1935 |